United States Patent
Esener et al.

(10) Patent No.: US 6,574,028 B2
(45) Date of Patent: Jun. 3, 2003

(54) OPPOSING ELECTRODE LIGHT MODULATOR ARRAY AND METHOD FOR MANUFACTURING THE SAME

(75) Inventors: Sadik Esener, Solana Beach, CA (US); Yossi Ronen, Herzelia (IL)

(73) Assignees: Creo IL Ltd., Herzlia (IL); The Regents of the University of California, Oakland, CA (US)

(*) Notice: Subject to any disclaimer, the term of this patent is extended or adjusted under 35 U.S.C. 154(b) by 0 days.

(21) Appl. No.: 10/034,992

(22) Filed: Dec. 28, 2001

(65) Prior Publication Data

US 2002/0141030 A1 Oct. 3, 2002

Related U.S. Application Data

(63) Continuation-in-part of application No. 09/547,305, filed on Apr. 11, 2000.
(60) Provisional application No. 60/163,315, filed on Nov. 3, 1999.

(51) Int. Cl.$^7$ .............................. G02F 1/03; G02F 1/07
(52) U.S. Cl. ..................................... 359/254; 359/245
(58) Field of Search ................................ 359/245, 247, 359/254, 315, 316, 321, 322, 323; 385/1, 2, 3, 4; 65/385; 438/51, 129

(56) References Cited

U.S. PATENT DOCUMENTS

| | | | | |
|---|---|---|---|---|
| 4,802,741 A | * | 2/1989 | Kaukeinen | 359/254 |
| 5,544,268 A | * | 8/1996 | Bischel et al. | 385/4 |
| 5,585,958 A | * | 12/1996 | Giraud | 359/265 |
| 5,734,491 A | * | 3/1998 | Debesis | 359/254 |
| 6,396,618 B1 | * | 5/2002 | Esener et al. | 359/254 |
| 6,486,996 B1 | * | 11/2002 | Romanovsky | 359/245 |

\* cited by examiner

Primary Examiner—Ricky Mack
Assistant Examiner—Brandi N Thomas
(74) Attorney, Agent, or Firm—Greer, Burns & Crain, Ltd.

(57) ABSTRACT

An improved linear light modulator array is formed with opposing electrodes which extend away from the optic surfaces of optoelectronic material used to form the array. A uniform electric field is created across a modulator volume, generally perpendicular to light propagation within the modulator volume. The modulator volume of an element in the array is a function of electrode length, width and separation. Additional elements are defined by additional pairs of electrodes. Trenches in the electrooptical material separate adjacent electrodes of separate modulator elements. A preferred depth of trench penetrates the electrooptical material about 10–15% of the distance between opposing electrodes. The geometry is obtained by cutting optoelectronic material into strips. Cut sides of the strips are metallized, one at a time, with the opposite side temporarily affixed to a carrier. Aligned trenches are cut into the metallized strips and electrooptical material to separate electrode pairs, reduce crosstalk and define array elements.

12 Claims, 7 Drawing Sheets

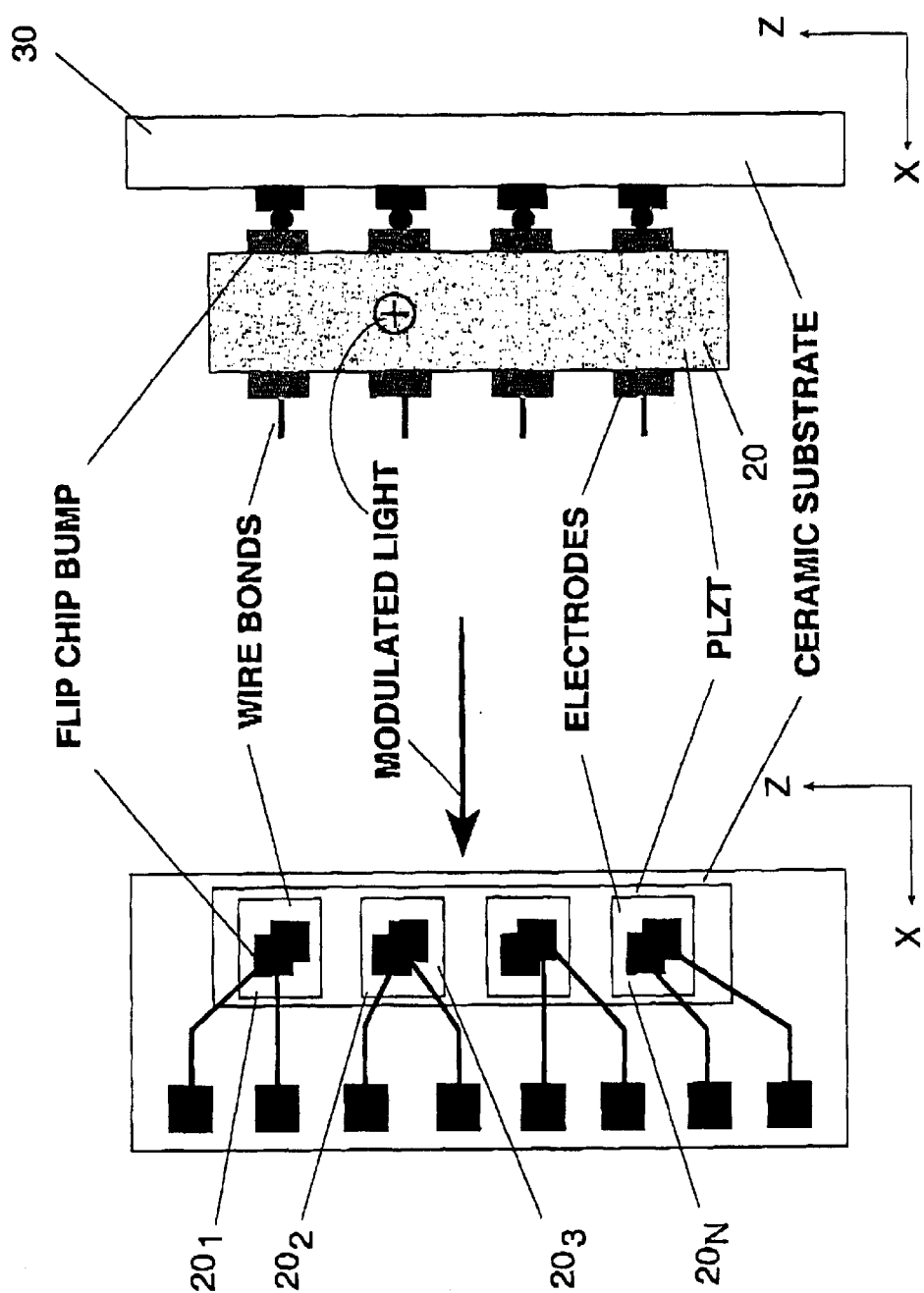

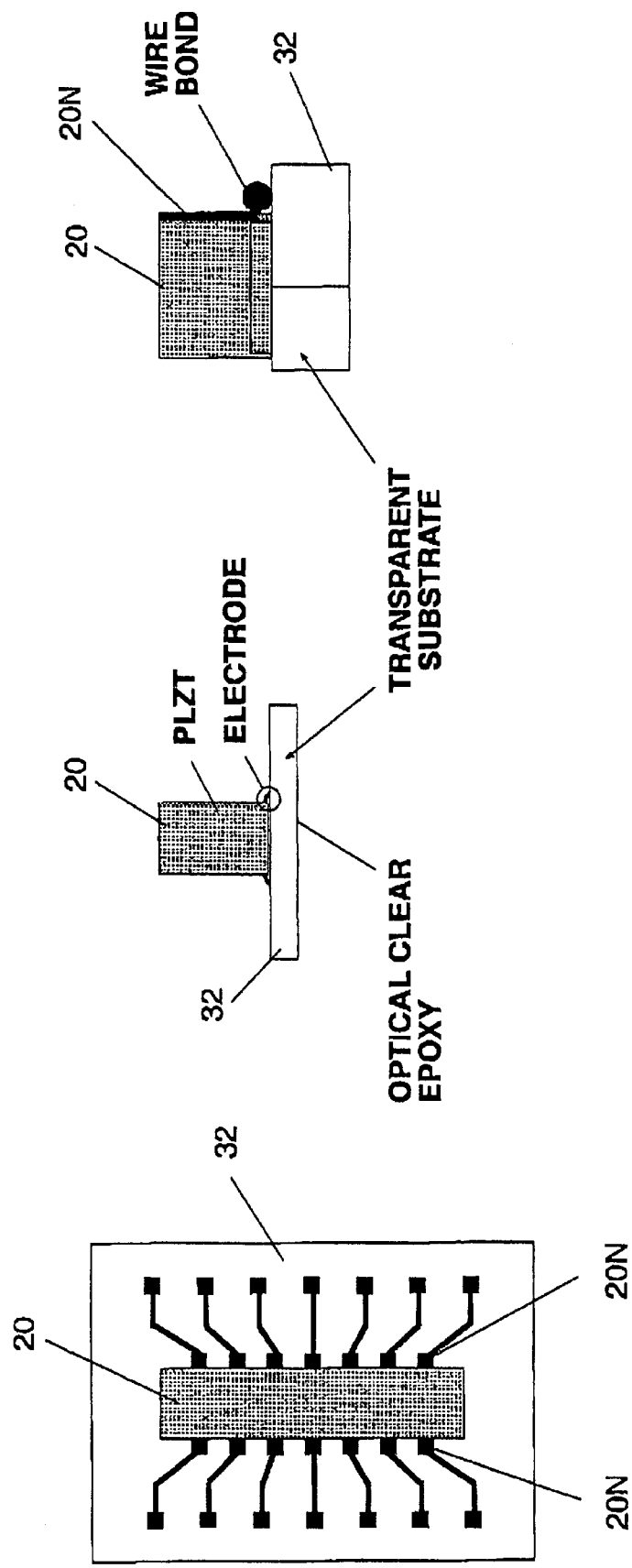

OPPOSING ELECTRODE LIGHT MODULATOR ARRAY AND METHOD FOR MANUFACTURING THE SAME

REFERENCE TO RELATED APPLICATION

This application is a continuation-in-part of and claims priority under 35 U.S.C. §120 from copending application Ser. No. 09/547,305, filed on Apr. 11, 2000, which claimed priority from provisional application No. 60/163,315 filed on Nov. 3, 1999, under 35 U.S.C. §119(e).

FIELD OF THE INVENTION

The field of the present invention is the field of light modulator arrays.

BACKGROUND OF THE INVENTION

Controlled modulation of light beams is a fundamental basis for a variety of useful devices. Examples include scanners, laser printers, and optical communication devices. Resolution in scanners and printers depends in large part on the ability to avoid interference from closely spaced modulated light beams. Similarly, bandwidth of optical communication devices is limited by interference between closely spaced modulator elements. Conventional light modulator arrays present one barrier to improved performance due to interference effects between adjacent elements in such arrays. Light modulator arrays are formed from electrooptical materials. Exemplary electrooptical materials include Lead Zircanate Titanate (PLZT), Barium Titanate, Strontium Barium Niobate, Gallium Arsenide, Potassium Tantalum Niobate, and materials having similar properties. Formation of conventional light modulator arrays typically involves the formation of electrodes on a wafer of electrooptical material. A pattern of electrodes defines discrete elements in the array. The surface on which the electrodes are formed becomes a light incident surface. The resultant geometry for the array has pairs of electrodes disposed on the light incident surface of the array. The electrodes are generally perpendicular to the incident light beam to be modulated.

Drawbacks arise in such a geometry. A first limitation arises from the planar geometry which limits penetration of the applied electric field into the electrooptic material to thereby reduce interaction length of the material and of the optical beam. A second limitation results from the fact that the applied modulation electric field to a given modulator increases the physical modulator dimension in the direction of the applied electric field as a result of piezoelectric modulation. This deformation introduces stress to neighboring modulators. Taking an example, PLZT light modulators can efficiently modulate large optical powers for optical wavelengths above 600 nm. However, PLZT modulator arrays have not found a large span of applications, due to limitations imposed by large applied voltages to achieve half wave modulation and because of the inter-pixel crosstalk resulting from strain birefringence.

Prior patents, including U.S. Pat. Nos. 5,198,920 and 5,260,719, have introduced packaging concepts that address either the interaction length or birefringence problem. No approaches have been put forward until now, to the best of our knowledge, that can fundamentally eliminate both limitations at once. In addition, the prior patents fail to address the basic issue of an array geometry that addresses these problems independently of a particular packaging approach. Instead, some particular packaging solutions have compensated for a problem inherent to the conventional planar array geometry.

Another limitation of previous device geometries has been their fabrication and packaging complexity leading to high cost modulator arrays. Many devices which use such arrays, e.g., laser printers and scanners, require low cost components since price competition is strong in the markets for such devices. Thus, there is a need for an improved light modulator array geometry.

SUMMARY OF THE INVENTION

Such needs are met or exceeded by the present invention. According to the invention, an improved linear light modulator array is formed with opposing electrodes that extend away from the optic surfaces of electrooptical material used to form the array. A uniform electric field is created across a modulator volume, generally perpendicular to light propagation within the modulator volume. The modulator volume of an element in the array is a function of electrode length, width and separation. Additional elements are defined by additional pairs of electrodes. Trenches that penetrate the electrooptical material are disposed between modulator elements. Preferably, the trenches penetrate the electrooptical material a distance that is approximately 10–15% of a distance separating opposing electrodes.

The invention includes a method for forming the array geometry of the invention. According to the method, electrooptical material into, is cut into strips. Cut sides of the strips are metallized, one at a time, with the opposite side temporarily affixed to a carrier. Aligned trenches are cut in the metallized strips and the electrooptical material to separate electrode pairs and define array elements.

BRIEF DESCRIPTION OF THE DRAWINGS

Other features, objects and advantages of the invention will be apparent by reference to the detailed description of the invention and the drawings, of which:

FIGS. 6A and 6B illustrate an exemplary preferred reflective packaging solution for linear light modulator arrays of the invention;

FIGS. 7A–7C illustrate an exemplary preferred transmissive packaging solution for linear light modulator arrays of the invention;

DETAILED DESCRIPTION OF THE INVENTION

The invention is directed to a light modulator array geometry in which opposing electrode pairs extend away from an optical surface of the array. The modulation volume of a particular element in an array becomes a function of the length, width and separation of the electrodes. The field created between the electrodes is uniform through the modulation depth and is generally perpendicular to the path of a light beam modulated by the element. Trenches formed between elements limit cross talk.

Figure 1B:
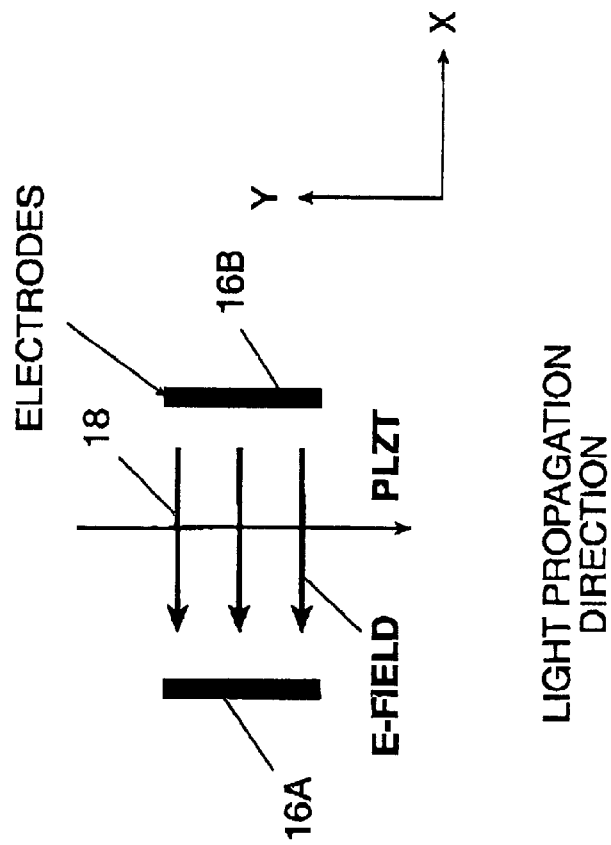
FIG. 1B illustrates a light modulator array element geometry according to the present invention and resultant electric field.
Figure 1A:
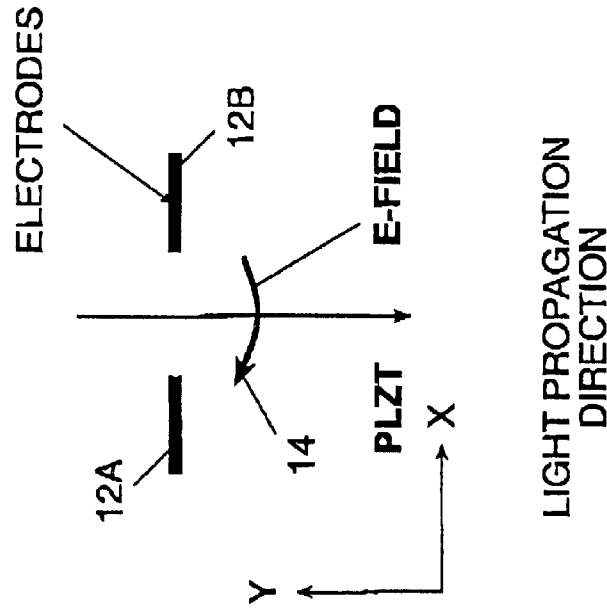
FIG. 1A illustrates a conventional light modulator array element geometry and resultant electric field.

Artisans will appreciate many benefits of the present geometry. Crosstalk due to strain birefringence between array elements is reduced or eliminated. The electric field is applied across the electrooptic modulator material rather than parallel to one of the array's optical surfaces. This extends the interaction length of light with the electrooptic material under the influence of the field to the full width of the material rather than being limited to a thin surface layer. The longer interaction length allows for an increase in contrast ratio and a decrease in the necessary applied voltage. The present geometry also provides a higher fill factor, since the electrodes, unlike in conventional modulators, do not occlude the optical beam path. A better array uniformity in contrast ratio is produced when polycrystalline materials, such as PLZT, are used since with the new geometry the volume (the number of poly grains) in each modulator of the modulating material is maximized. Finally, the fabrication procedure for this structure is straightforward and does not require any lithographic steps. The present geometry can therefore be implemented at low cost. Referring now to the drawings, and particularly FIGS. 1A and 1B, a schematic comparison is made between the geometry and electric field distribution between electrodes for an individual conventional modulator element (FIG. 1A) and a modulator element according to the present invention (FIG. 1B). Conventional manufacturing techniques produce an array geometry by forming electrodes on the surface of a wafer of electrooptical material. This produces the geometry of FIG. 1A, with a pair of electrodes 12A and 12B being disposed on optic surface end-to-end and perpendicular to the light propagation direction. A resultant electric field 14 is non-uniform and poorly penetrates the electrooptical materials. The orientation of the field also produces birefringence effects in neighboring elements. Manufacturing techniques of the invention produce the geometry illustrated in FIG. 1B, with a pair of electrodes 16A and 16B extending away from the optical surface. The electrodes 16A and 16B are disposed opposite each other and parallel to the propagation of light beams within the element. A uniform electric field 18 is created across the path of light propagation within the element. A modulation volume is defined by the length, width and separation of the electrode pairs 16A and 16B.

Figure 2:
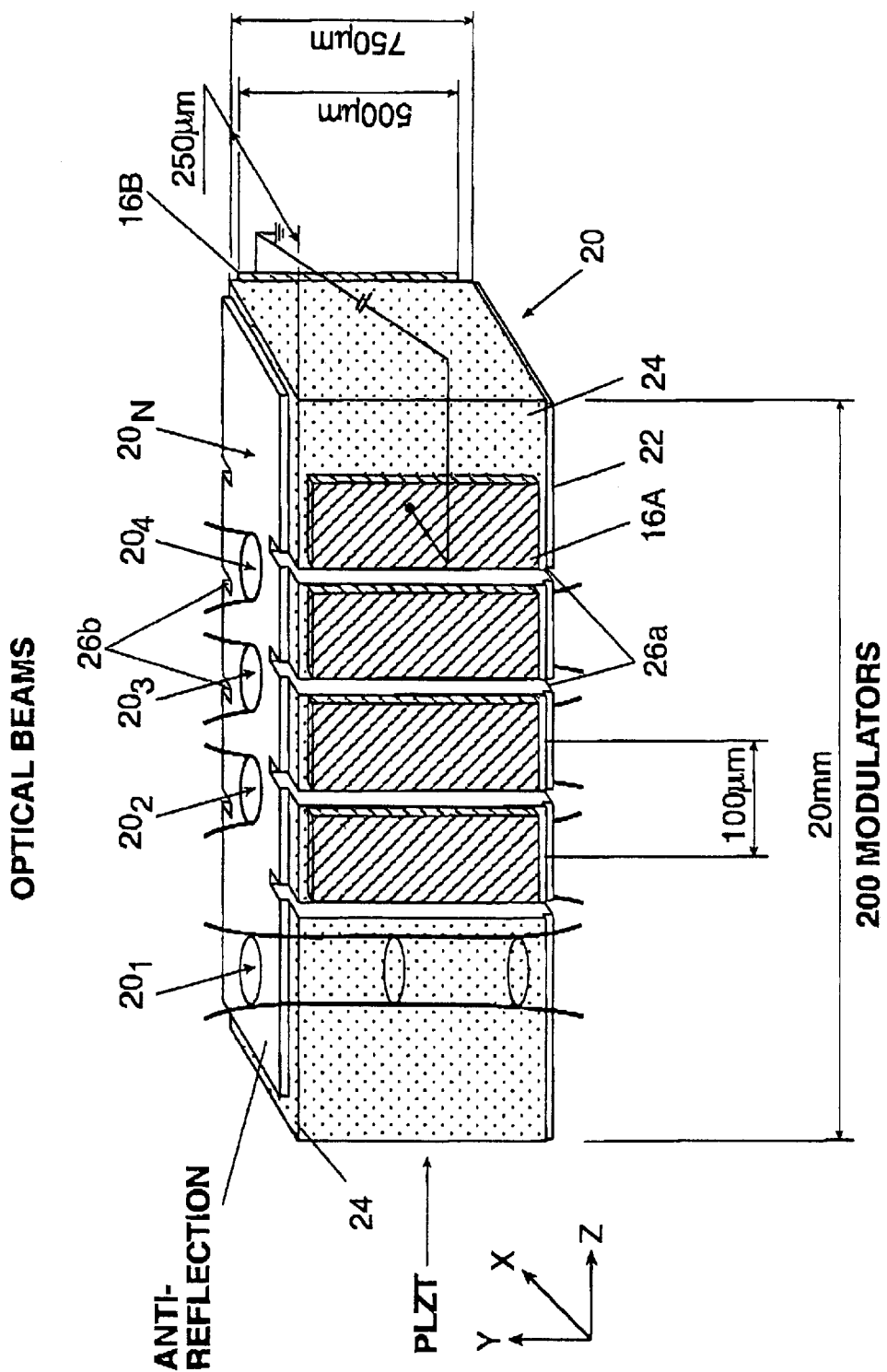
FIG. 2 illustrates a preferred linear light modulator array according to the present invention of exemplary dimensions including trenches in the electrooptical material between electrodes of different modulator elements.

The replication in the z direction of the modulator geometry described in FIG. 1 leads to the array geometry shown in FIG. 2. A linear light modulation array 20 of multiple elements $20_1$–$20_N$ formed in the geometry of the present invention is shown in FIG. 2. The geometry may produce a reflective modulation array or a transmissive modulation array depending upon the choice for a light guide coating 22 formed on optical surfaces 24 of linear light modulation array 20. Light guide coating, as used herein, encompasses both reflective and anti-reflection coatings. The light modulation array 20 illustrated in FIG. 2 has light transmissive, i.e., antireflection, coating. This produces a transmissive light modulation array. A reflective array is obtained by making the optical surface which is not the light incident surface reflective through use of a reflective coating.

In the FIG. 2 geometry, the piezo-electric expansion occurs only in the x direction since the electric field direction is in the x direction. Crosstalk resulting from strain birefringence from neighboring pixels is eliminated. Inter-pixel crosstalk is minimized by trenches 26a, 26b. The trenches 26a, 26b penetrate the electrooptical material structure 20 between electrodes of separate elements $20_1$–$20_N$. The array size can be extended greatly and is limited only by packaging and device handling considerations. Dimensions, i.e. the lower size limit of elements, separation, etc., is limited primarily by the micro fabrication techniques used with the method of the invention. The invention is not limited by the exemplary dimensions shown in FIG. 2.

Figure 3:
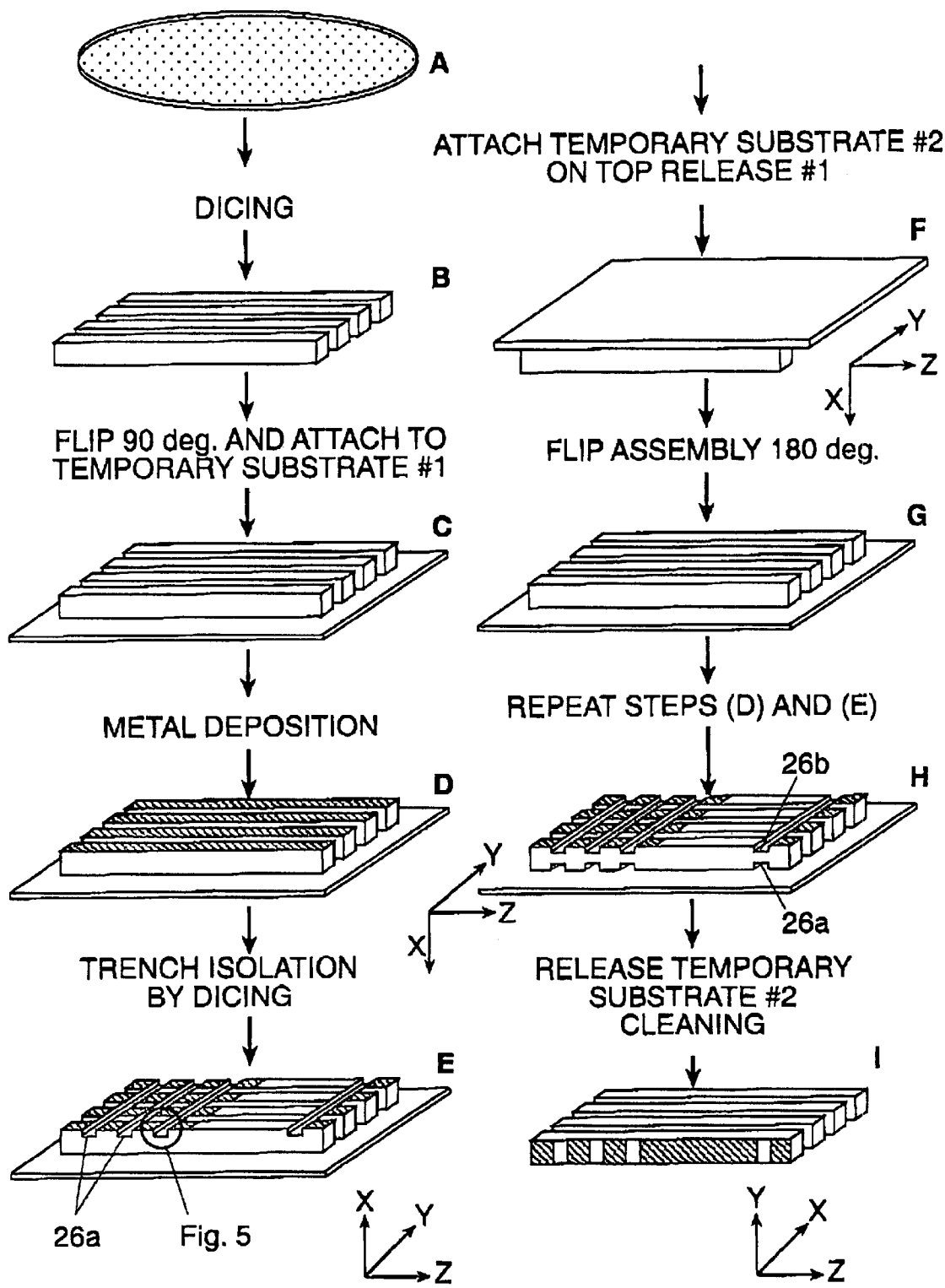
FIGS. 3A–3I illustrate steps of a method for forming a linear light modulator array according to the present invention including trenches in the electrooptical material.

The method for producing the geometry of the invention, as shown in FIGS. 1 and 2, is illustrated in FIG. 3. The method begins with wafers of transverse electrooptical material coated on both sides with an appropriate reflective or antireflection dielectric coating. FIG. 3A shows a coated PLZT wafer 24 as a starting material, but other transverse electrooptic materials are suitable, as discussed above. Transmissive and reflective as well as FP (Fabry Perot) light modulators can be fabricated by simply appropriately coating the wafers with anti-reflection coatings on both sides, reflective coating on a single side, and reflective coatings on both sides, respectively.

In FIG. 3B, the wafer is cut into long and thin slices. The cutting is carried out, for example, by a conventional computerized circular saw. Other techniques capable of precisely making parallel cuts are also suitable. In FIG. 3C, the wafer slices are each turned by 90° around their z axis to expose a cut side of each wafer slice. The wafer slices are then temporarily affixed to a chip carrier in FIG. 3C. A suitable temporary adhesive is blue tape.

Figure 4:
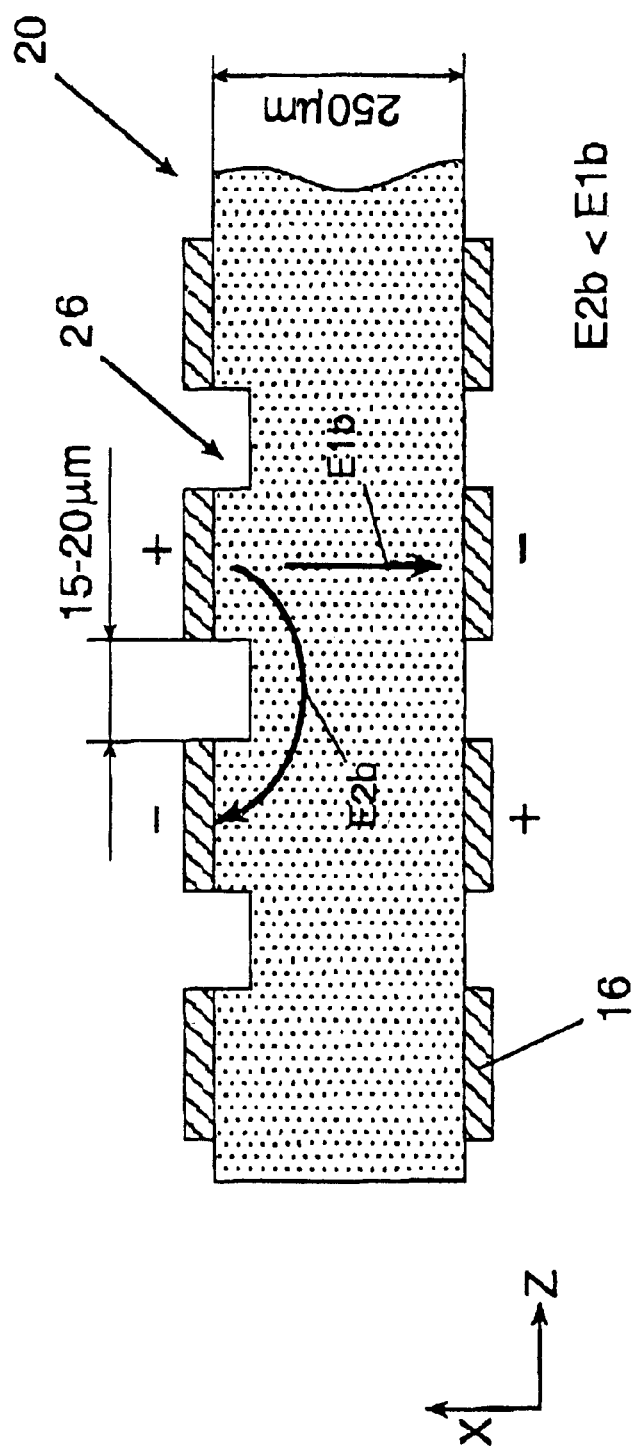
FIG. 4 illustrates electric fields in a particular preferred embodiment of the invention including exemplary dimensions.
Figure 5:
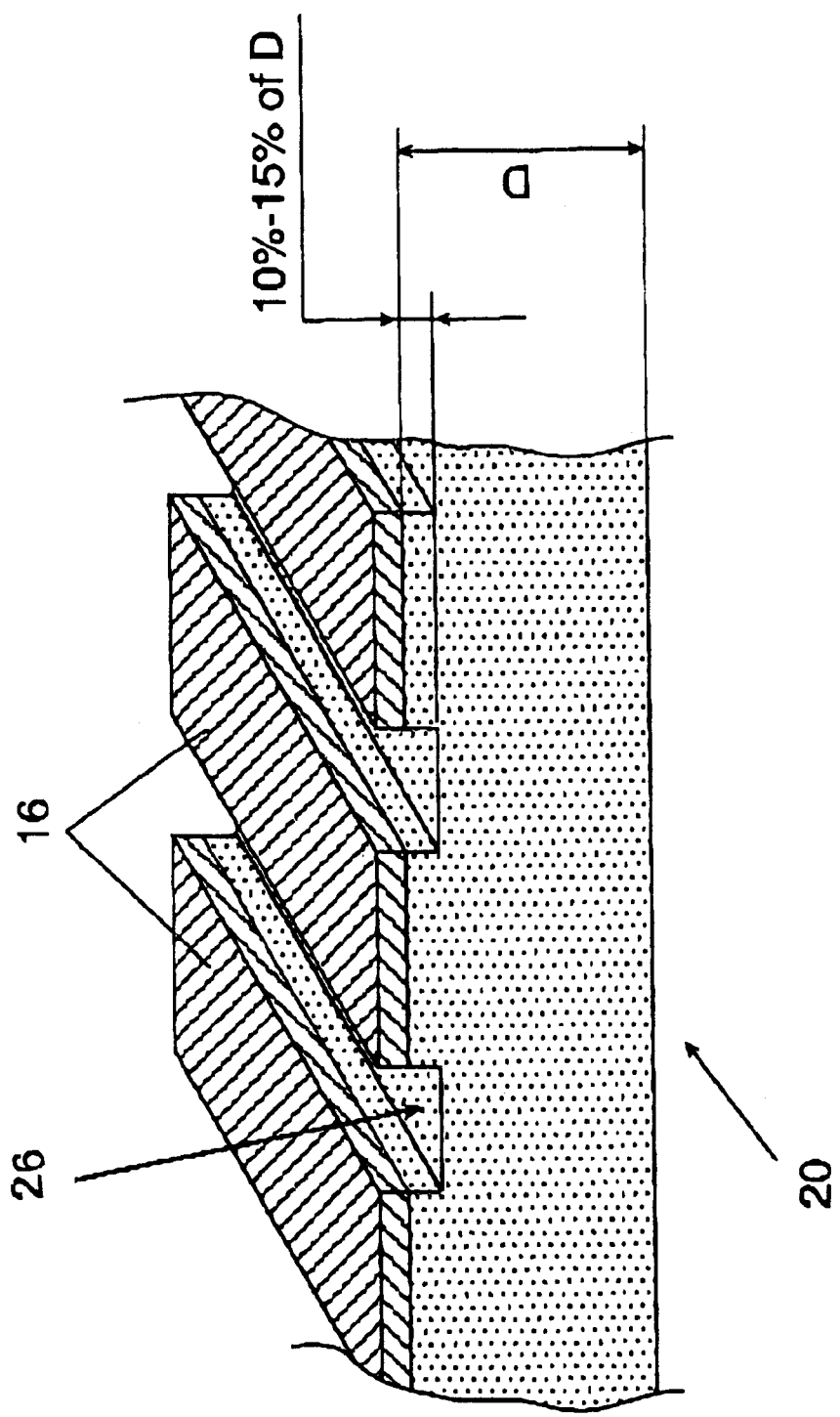
FIG. 5 illustrates a preferred trench of the invention.

After affixation to the chip carrier, metal for electrodes can be formed on the exposed cut surface opposite the temporary carrier in FIG. 3D. Conventional methods for forming a metal layer are suitable. Standard evaporation techniques, for example, which first form chromium then gold or aluminum deposits produce a suitable metal layer. After metallization, in FIG. 3E, trenches 26 are formed, at a 90° angle to the cut used to form the wafer slices, to produce isolated electrode regions. These trenches 26a serve to separate deposited metal into separate electrodes. The trenches 26a also penetrate the electrooptical material to electrically isolate each array element. The electrical isolation will reduce the cross talk between two neighboring electrodes on the same surface. This is understood when considering the data in Table 1, and the practical example in FIGS. 4 and 5, as the trench cut into the electrooptical material elongates the path for stray electric fields, thus reducing its effect relative to the main electric field between opposing electrodes 16. This is illustrated in FIG. 4, where the field between adjacent electrodes $E2_b$ is less than the field between opposing electrodes $E1_b$. A preferred exemplary trench 26 is shown in FIGS. 4 and 5, where the practical depth of the trench 26 is approximately 10%–15% of the distance D between the opposing electrodes 16. The trenching operation may be formed by conventional cutting techniques, e.g. with a circular saw, which results in a "clean" cut in the electrooptical material, to the desired depth with an accuracy of 2–3 microns. Other cutting techniques or material remove techniques may be used, and may result in trenches having a different geometrical profile.

Upon completion of the trenches in FIG. 3E, half the process is complete and the steps of FIGS. 3C–3E are repeated on the opposite cut side of the wafer slices to complete the process. Care is taken in repeating these steps to align the trench cutting.

To form electrodes on the opposite cut side of the wafer slices, the wafer slices are preferably transferred and temporarily attached to a second carrier, as seen in FIGS. 3F and 3G. The steps of FIGS. 3D and 3E are repeated in FIG. 3H to form the electrodes on the other side of the wafer slices. Cutting here has to be carefully aligned to register the trenches 26a, 26b on each side of the slices with respect to each other. This step concludes the fabrication of the devices that are now ready for testing and packaging in step 31 after release from the carrier and any necessary cleaning to remove protective photo-resist or any accumulated residues. Modulator dimensions as small as 100 microns are achievable though the fabrication process does not require use of any photolithographic steps.

The trenches 26 that penetrate the electrooptical material minimize or eliminate crosstalk by elongating the path for stray electric fields, as discussed above with respect to FIG. 4. Crosstalk may also be addressed between neighboring modulator elements for digital applications by biasing. For example, we biased exemplary devices lacking trenches according to a look up table that can be, for example, implemented with a read only memory device before the signals are amplified and fed to the modulator array. The logic behind this look up table is given below:

TABLE 1

|  | desired state | appl voltage | desired state | appl voltage | desired state | appl voltage | desired state | appl voltage | desired state | appl voltage | desired state | appl voltage |
|---|---|---|---|---|---|---|---|---|---|---|---|---|
| Mod I − 1 | on | $V_\Pi 0$ | off | $0; V_\Pi/2$ | off | $0; V_\Pi/2$ | off | $0; 0$ | on | $V_\Pi 0$ | off | $0; 0$ |
| Mod I | on | $V_\Pi 0$ | on | $V_\Pi 0$ | on | $V_\Pi 0$ | off | $0; V_\Pi 2$ | off | $0; V_\Pi/2$ | off | $0; 0$ |
| Mod I + 1 | on | $V_\Pi 0$ | on | $V_\Pi 0$ | off | $0; V_\Pi/2$ | on | $V_\Pi 0$ | on | $V_\Pi 0$ | off | $0; 0$ |

In table 1, the first value in the applied voltage columns indicates the signal voltage to be applied to the front electrode and the second value indicates the signal voltage to be applied to the back electrode. $V_\pi$ is the required half-wave voltage. Through this logic, the applied electric field between the front and back electrodes of two neighboring cells of opposite modulation states can be minimized. The effect of such minimization is reduced crosstalk, and especially powerful reduction in crosstalk when trenches are used in combination with the signal logic.

A discussion of packaging is included here to illustrate application of the array of the light modulator arrays of the invention and to provide a set of preferred solutions for respective reflective and transmissive devices. Light modulator arrays of the invention will typically be packaged for operation. In a packaging, an important issue is providing electrical access to each of the modulator elements.

For reflective devices, an exemplary preferred solution is shown in FIGS. 6A and 6B. FIG. 6A is top view and FIG. 6B a side view. In this packaging approach a mixture of flip-chip bonding and wire bonding schemes are used. The modulator array 20 is first flip-chip bonded on a side on a ceramic substrate and afterwards the electrodes on the other side of the array are wire bonded to the appropriate pads of the ceramic substrate. The ceramic substrate 30 is then handled as a conventional chip in a PGA (Pin Grid Array).

FIGS. 7A–7C illustrate a preferred transmissive packaging approach for a modulator array of the invention. Here, the modulator array 20 is mounted face up on a transparent chip carrier 32. The difficulty in this case is to make electrical connection between the modulator electrodes and wiring on the transparent carrier. Wire bonders capable of accomplishing this task have become commercially available. The main application of these bonders has been the packaging of magnetic heads for hard disk drive. This approach should also be useful for light modulator arrays fabricated with this above described processes. Packaging multiple linear arrays together can be used to create 2-D spatial reflective or transmissive light modulators.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A light modulator linear array of multiple modulator elements comprising:

electrooptic material having opposing optical surfaces;

a plurality of spaced apart pairs of opposing electrodes, each pair of opposing electrodes being disposed along at least a portion of opposing electrode surfaces extending between said opposing optical surfaces, each pair of opposing electrodes defining one of the multiple modulator elements within the light modulation material; and trenches disposed between said modulator elements, said trenches penetrating said electrooptical material.

2. The light modulator linear array according to claim 1, wherein each said pair of opposing electrodes extends substantially an entire length between said opposing optical surfaces.

3. The light modulator linear array according to claim 2, wherein the length between said opposing optical surfaces defines an interaction length and each said pair of opposing electrodes, when stimulated, creates a electric field perpendicular to said interaction length.

4. The light modulator linear array according to claim 1, wherein the length between said opposing optical surfaces defines an interaction length and each said pair of opposing electrodes, when stimulated, creates a electric field perpendicular to said interaction length.

5. The light modulator linear array according to claim 1, wherein a modulating volume of an element in the linear array is a function of the length, width and separation of its corresponding pair of opposing electrodes.

6. The light modulator linear array according to claim 1, wherein separation between adjacent ones of said pairs of opposing electrodes is about 15 to 25 microns.

7. The light modulator linear array according to claim 1, further comprising a light guide coating on said opposing optical surfaces.

8. The light modulator linear array according to claim 1, wherein said trenches penetrate said electrooptical material a distance that is approximately 10–15% of a distance separating opposing electrodes.

9. A method for manufacturing a light modulator linear array from a wafer of electrooptic material, the method comprising steps of:
- cutting the wafer through its width to form at least one strip of electrooptic material;
- temporarily affixing a cut side of said at least one strip to a carrier;
- forming metal onto an opposite cut side of said at least one strip;
- cutting trenches into the metal and electrooptical material to separate deposited metal into discrete electrodes;
- repeating said steps of temporarily affixing, forming metal, and forming trenches to form opposing discrete electrodes separated by trenches and define discrete modulator elements thereby completing a linear array.

10. The method according to claim 8, wherein said wafer is coated with light guide material prior to said step of cutting.

11. A light modulator linear array of multiple modulator elements comprising:
- electrooptical material having opposing optical surfaces;
- spaced apart pairs of opposing electrodes, each pair of electrodes defining a modulator volume in the electrooptical material, and each pair of spaced apart electrodes being generally perpendicular to said opposing optical surfaces; and
- trenches in said electrooptical material between adjacent electrodes of separate modulator elements.

12. The light modulator linear array according to claim 11, wherein said trenches penetrate said electrooptical material a distance that is approximately 10–15% of a distance separating opposing electrodes.

* * * * *

UNITED STATES PATENT AND TRADEMARK OFFICE
CERTIFICATE OF CORRECTION

PATENT NO.   : 6,574,028 B2
DATED        : June 3, 2003
INVENTOR(S)  : Esener et al.

It is certified that error appears in the above-identified patent and that said Letters Patent is hereby corrected as shown below:

<u>Column 7,</u>
Line 17, delete "8" and insert -- 9 -- thereto.

Signed and Sealed this

Fifth Day of October, 2004

JON W. DUDAS
*Director of the United States Patent and Trademark Office*